United States Patent
Dowling et al.

(10) Patent No.: US 12,166,908 B2
(45) Date of Patent: Dec. 10, 2024

(54) SYSTEMS AND METHODS FOR FACILITATING BLOCKCHAIN OPERATIONS INVOLVING ON CHAIN AND OFF CHAIN INTERACTIONS

(71) Applicant: Coinbase, Inc., Oakland, CA (US)

(72) Inventors: Lauren Dowling, Oakland, CA (US); Anthony DeMartino, Oakland, CA (US); Daniel Kwasnick, Oakland, CA (US); Luyi Zhang, Oakland, CA (US); Rick Huynh, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 343 days.

(21) Appl. No.: 17/810,135

(22) Filed: Jun. 30, 2022

(65) Prior Publication Data

US 2024/0007309 A1    Jan. 4, 2024

(51) Int. Cl.
*H04L 9/00* (2022.01)
(52) U.S. Cl.
CPC .................... *H04L 9/50* (2022.05)

(58) Field of Classification Search
None
See application file for complete search history.

(56) References Cited

U.S. PATENT DOCUMENTS

| | | | |
|---|---|---|---|
| 2019/0356471 A1* | 11/2019 | Vaughn | H04L 9/3247 |
| 2020/0112444 A1* | 4/2020 | Yoshihama | H04L 43/0858 |
| 2021/0264420 A1* | 8/2021 | Tammana | G06Q 20/02 |
| 2023/0088674 A1* | 3/2023 | Lee | H04L 9/50 705/75 |
| 2024/0135369 A1* | 4/2024 | Le Van Gong | G06Q 20/3825 |

* cited by examiner

*Primary Examiner* — Joshua Joo
(74) *Attorney, Agent, or Firm* — Foley & Lardner LLP

(57) ABSTRACT

Systems and methods recite the use of a platform service that determines a specific type of data (e.g., a processing metric) based on current network conditions (e.g., current congestion on a blockchain network). The processing metric is then used to account for variations in processing characteristics of a blockchain network occurring while the platform service integrates the on-chain and off-chain interactions. Accordingly, while the platform service performs the integration by triggering an on-chain blockchain operation in response to a communication to initiate an off-chain response, the processing metric accounts for any delays and/or volatility in the network conditions.

20 Claims, 6 Drawing Sheets

SYSTEMS AND METHODS FOR FACILITATING BLOCKCHAIN OPERATIONS INVOLVING ON CHAIN AND OFF CHAIN INTERACTIONS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Systems and methods are described herein for novel uses and/or improvements to blockchains and blockchain technology. As one example, systems and methods are described herein for facilitating blockchain operations involving on-chain and off-chain interactions across a computer network and between disparate systems. More specifically, the systems and methods describe the use of a platform service that may facilitate the use of cryptocurrencies in everyday interactions between users. For example, while the awareness of cryptocurrencies and their use in decentralized applications have grown in recent years, a fundamental issue with further adoption of the use of cryptocurrencies is their inability to be used in day-to-day commercial interactions between users. This fundamental issue raises numerous technical problems as no mechanism currently exists for integrating on-chain interactions (e.g., communications, transactions, etc., performed on-chain via one or more smart contracts) and off-chain interactions (e.g., communications, transactions, etc., performed off-chain via conventional means).

To overcome these technical deficiencies in conventional systems, systems and methods disclosed herein recite the use of a platform service that determines a specific type of data (e.g., a processing metric) based on current network conditions (e.g., current congestion on a blockchain network). The processing metric is then used to account for variations in processing characteristics of a blockchain network occurring while the platform service integrates the on-chain and off-chain interactions. Accordingly, while the platform service performs the integration by triggering an on-chain blockchain operation in response to a communication to initiate an off-chain response, the processing metric accounts for any delays and/or volatility in the network conditions. As part of the integration, the platform service may determine a first blockchain operation characteristic based on an off-chain characteristic (e.g., as received in an initial off-chain communication). The system may then determine a second blockchain operation characteristic based on the processing metric and the first blockchain operation characteristic. Having completed the integration, and accounted for potential delays and/or volatility in the network conditions, the system may then perform the blockchain operation with the second blockchain operation characteristic. The system may also simultaneously (or substantially simultaneously) transmit an off-chain response to an off-chain entity.

In some aspects, systems and methods for facilitating blockchain operations involving on-chain and off-chain interactions across a computer network and between disparate systems are described. For example, the system may receive an encrypted communication, from an off-chain entity, to initiate an off-chain response to a blockchain operation based on an interaction between a user and the off-chain entity, wherein the off-chain response comprises an off-chain characteristic. The system may determine a first cryptography-based storage application for conducting the blockchain operation, wherein the first cryptography-based storage application corresponds to the user. The system may determine a processing metric, wherein the processing metric is used to account for variations in processing characteristics of a blockchain network occurring during the blockchain operation. The system may determine a first blockchain operation characteristic based on the off-chain characteristic. The system may determine a second blockchain operation characteristic based on the processing metric and the first blockchain operation characteristic. The system may perform the blockchain operation with the second blockchain operation characteristic between a first address for the first cryptography-based storage application and a second address corresponding to a platform service. The system may transmit, from the platform service, the off-chain response to the off-chain entity.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
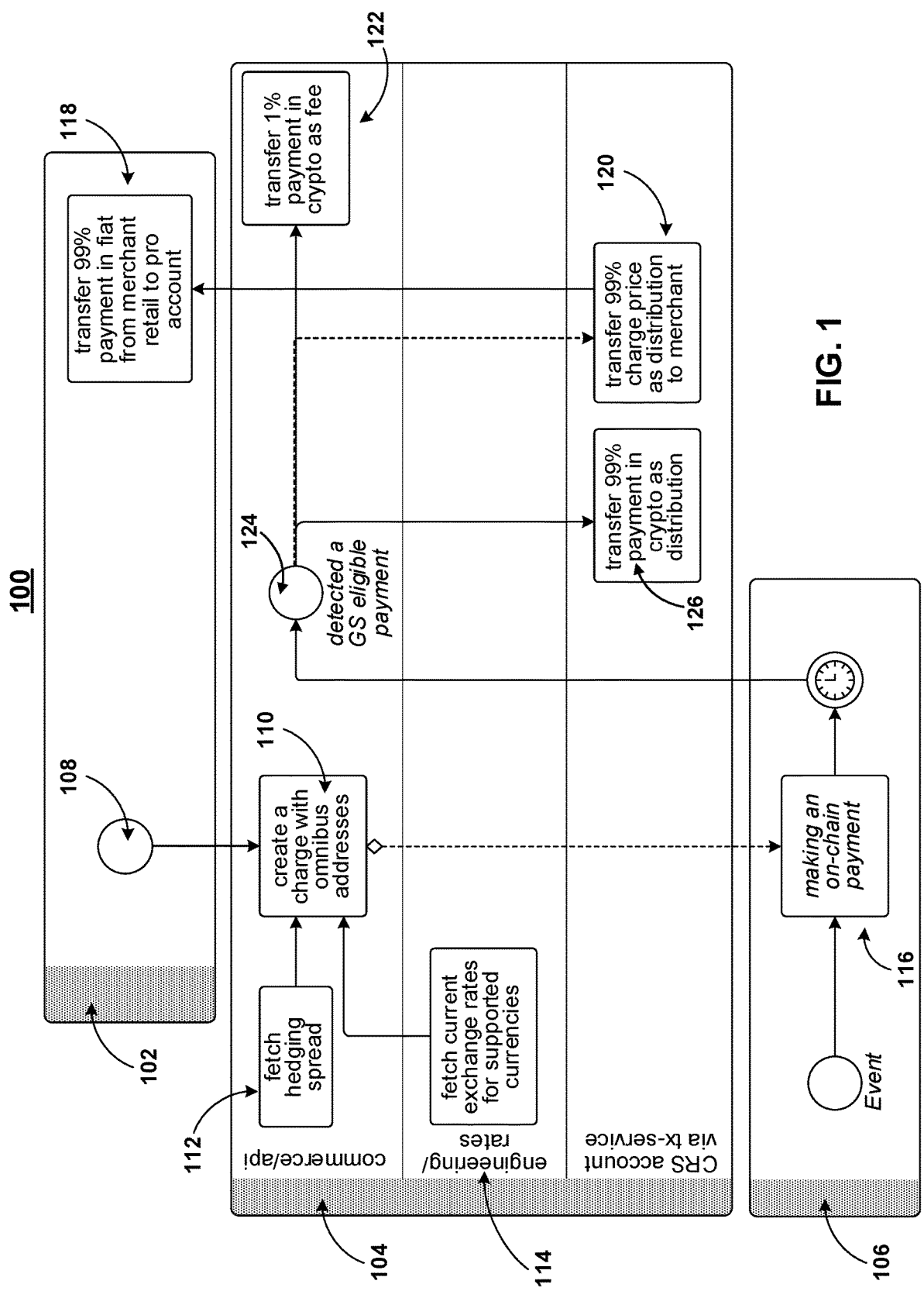
FIG. 1 shows an illustrative diagram for facilitating blockchain operations involving on-chain and off-chain interactions across a computer network and between disparate systems, in accordance with one or more embodiments.

FIG. 1 shows an illustrative diagram for facilitating blockchain operations involving on-chain and off-chain interactions in an encrypted manner across a computer network and between disparate systems, in accordance with one or more embodiments. For example, systems and methods are described herein for facilitating blockchain operations involving on-chain and off-chain interactions across a computer network and between disparate systems. More specifically, the systems and methods describe the use of a platform service that may facilitate the use of cryptocurrencies in everyday interactions between users.

For example, diagram 100 illustrates a workflow of an interaction between a first user (e.g., a user attempting to use cryptocurrency and/or other digital assets in a purchase) and a second user (e.g., a merchant providing a good or service). For example, while the awareness of cryptocurrencies and their use in decentralized applications have grown in recent years, a fundamental issue with further adoption of the use of cryptocurrencies is their inability to be used in day-to-day commercial interactions between users. This fundamental issue raises numerous technical problems as no mechanism currently exists for integrating on-chain interactions (e.g., communications, transactions, etc., performed on-chain via one or more smart contracts) and off-chain interactions (e.g., communications, transactions, etc., performed off-chain via conventional means).

For example, a merchant (e.g., the second user) may want to offer crypto payment options to its customers (e.g., the first user) but want to operate its business in fiat in a predictable way (e.g., may want to receive payment in a fiat currency).

The platform service discussed herein overcomes these issues by supporting all cryptocurrencies, enabling settlement in fiat and/or local currencies, guaranteeing a settlement price for merchants (e.g., by applying a processing metric), and/or managing risk for a platform service (by building a hedging fee into an exchange rate calculation). To do so, the platform service may support a plurality of managed cryptography-based storage applications. For example, as shown in diagram 100, a first cryptography-based storage application (e.g., digital wallet 102) may interact with a second cryptography-based storage application (e.g., digital wallet 106) via platform service 104. In some embodiments, digital wallet 102 and digital wallet 106 may comprise digital wallets managed by platform service 104.

For example, in response to an off-chain event (e.g., a purchase by a user), platform service 104 may receive communication 108. For example, the system may receive a communication from a merchant requesting authorization of a transaction involving a cryptocurrency. The merchant may be a self-managed merchant (e.g., has an account that is not managed by the platform service) or a custodial managed merchant (e.g., has an account that is managed by the platform service). The communication may comprise an electronic payment (or e-payment). For example, communication 108 may comprise an off-chain characteristic (e.g., an amount of a payment or charge requested by a merchant).

Communication 108 may be received by omnibus account 110. Omnibus account 110 may comprise an address on platform service 104 that acts to facilitate blockchain operations. For example, omnibus account 110 may comprise a pass-through funds account created to collect incoming payments for custodial charges. Upon receipt of communication 108, platform service 104 may fetch a processing metric (e.g., a hedging spread) from component 112. For example, the system may quantify the hedging spread/fee as a processing metric. As described herein, a processing metric may comprise a quantitative or qualitative assessment of current network conditions. For example, the processing metric may comprise a value that distinguishes one instance of network conditions from another. That is, the processing metric may quantify the volatility in a current exchange rate of a cryptocurrency to a fiat currency as determined at rate calculator 114.

Omnibus account 110 may determine a first blockchain operation characteristic based on the off-chain characteristic. For example, platform service 104 may determine an amount of cryptocurrency to be transacted during a blockchain operation that is automatically triggered in response to communication 108. Platform service 104 may then generate a blockchain operation with the first blockchain operation characteristic (e.g., based on an exchange rate from rate calculator 114). Platform service 104 may then generate (e.g., substantially simultaneously or after a predetermined interval) the performance of the blockchain operation in order to make on-chain payment 116 as well as generate off-chain response 118. As part of off-chain response 118, platform service 104 may make transfer 120 of a price to a first user (e.g., merchant) and hold a fee (e.g., fee 122). For example, platform service may detect a workflow at point 124 and perform one or more actions. The actions may result in a guaranteed settlement (e.g., "GS") or other operation to occur.

In some embodiments, the system may select a type of off-chain response (e.g., transfer 120, transfer 126, and/or off-chain response 118) based on characteristics about the off-chain entity. For example, the system may determine an entity characteristic for the off-chain entity (e.g., whether the off-chain entity corresponds a custodial or non-custodial account, whether the off-chain entity has certain privileges, whether the off-chain entity is registered to receive specific types of responses, etc.). The system may then determine whether the entity characteristic corresponds to a threshold characteristic. For example, the system may determine whether the entity is flagged as corresponding to a given characteristic. The system may then determine a type of off-chain response based on the entity. For example, in response to the entity characteristic corresponding to the threshold characteristic, the system may select a first type for the off-chain response (e.g., a payment in fiat currency). In response to the entity characteristic not corresponding to the threshold characteristic, the system may select a second type for the off-chain response (e.g., a payment in cryptocurrency).

The processing metric is then used to account for variations in processing characteristics of a blockchain network occurring while the platform service integrates the on-chain and off-chain interactions. Accordingly, while the platform service performs the integration by triggering an on-chain blockchain operation in response to a communication to initiate an off-chain response, the processing metric accounts for any delays and/or volatility in the network conditions. As part of the integration, the platform service may determine a first blockchain operation characteristic based on an off-chain characteristic (e.g., as received in an initial off-chain communication). The system may then determine a second blockchain operation characteristic based on the processing metric and the first blockchain operation characteristic. Having completed the integration, and accounted for potential delays and/or volatility in the network conditions, the system may then perform the blockchain operation with the second blockchain operation characteristic. The system may also simultaneously (or substantially simultaneously) transmit an off-chain response to an off-chain entity. For example, the system may generate off-chain response 118 without waiting for an on-chain event (e.g., on-chain payment 116) to occur, which may take several minutes for newly minted blocks to record the transaction along with any network fees.

Figure 2:
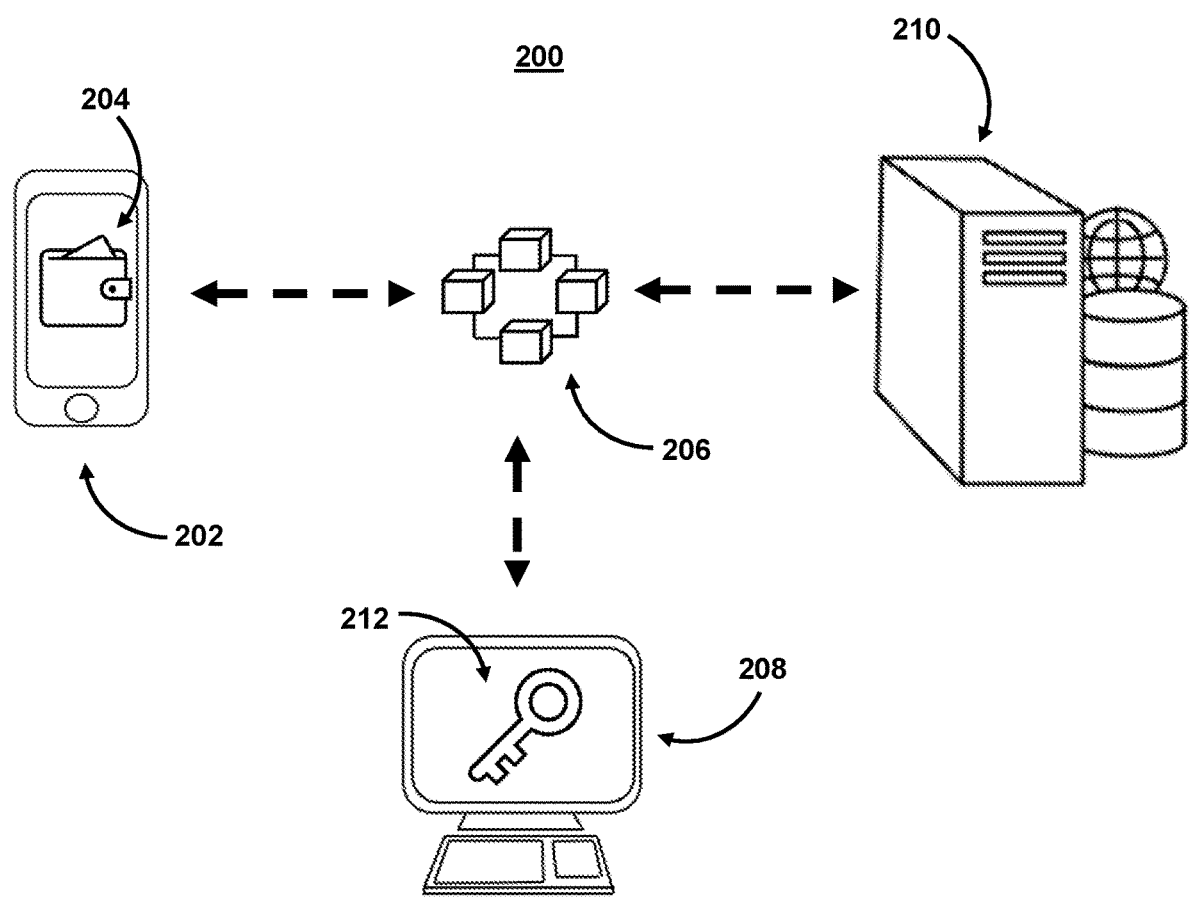
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to facilitate blockchain operations involving on-chain and off-chain interactions in an encrypted manner across a computer network and between disparate systems, in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to facilitate blockchain operations, and the user interface may display content related to facilitating blockchain operations. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to facilitating blockchain operations. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations such as facilitating blockchain operations. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a means for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
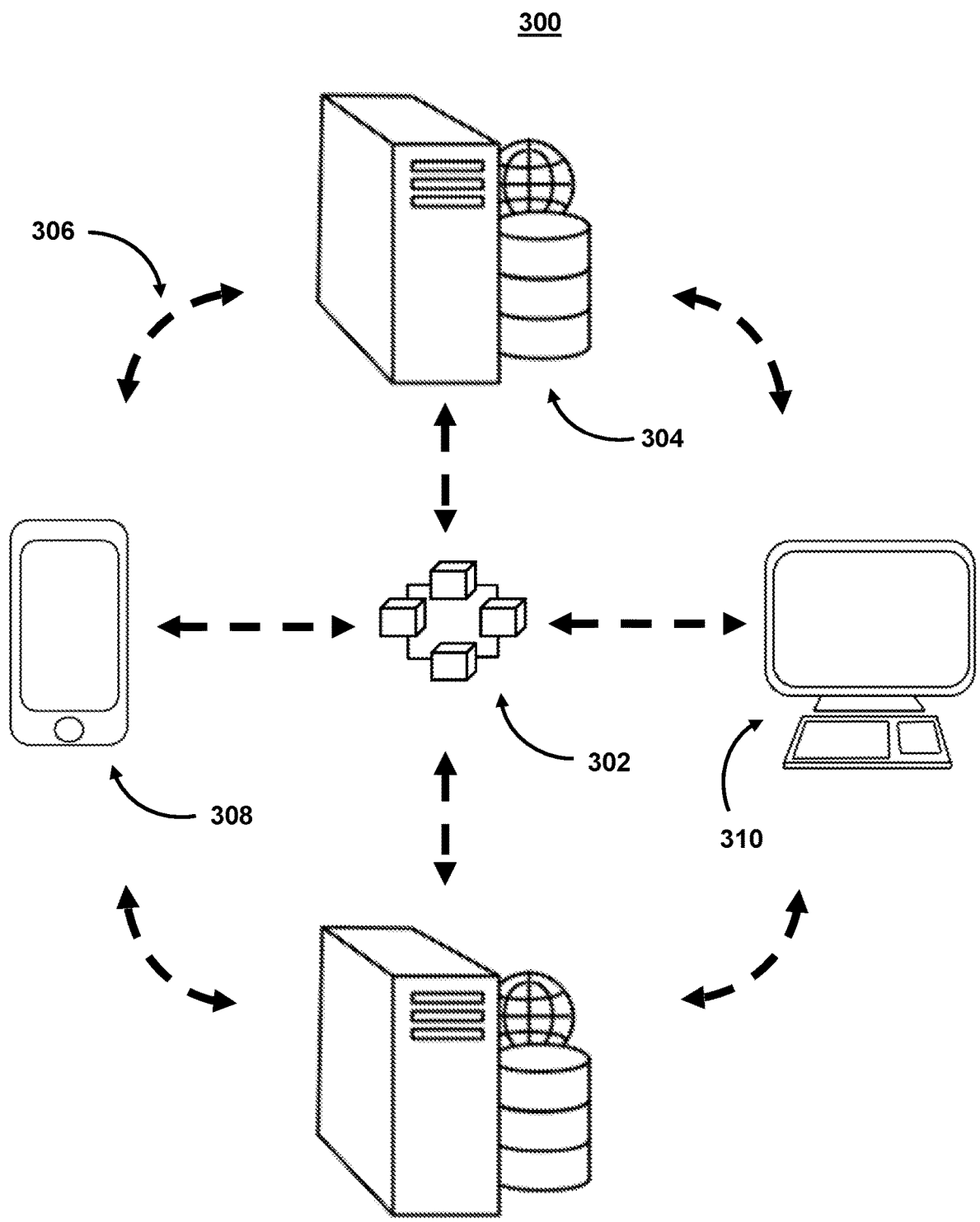
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may facilitate blockchain operations within a decentralized application environment. A decentralized application may comprise an application that exists on a blockchain (e.g., blockchain 302) and/or a peer-to-peer network (e.g., network 306). That is, a decentralized application may comprise an application having a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to facilitating blockchain operations within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
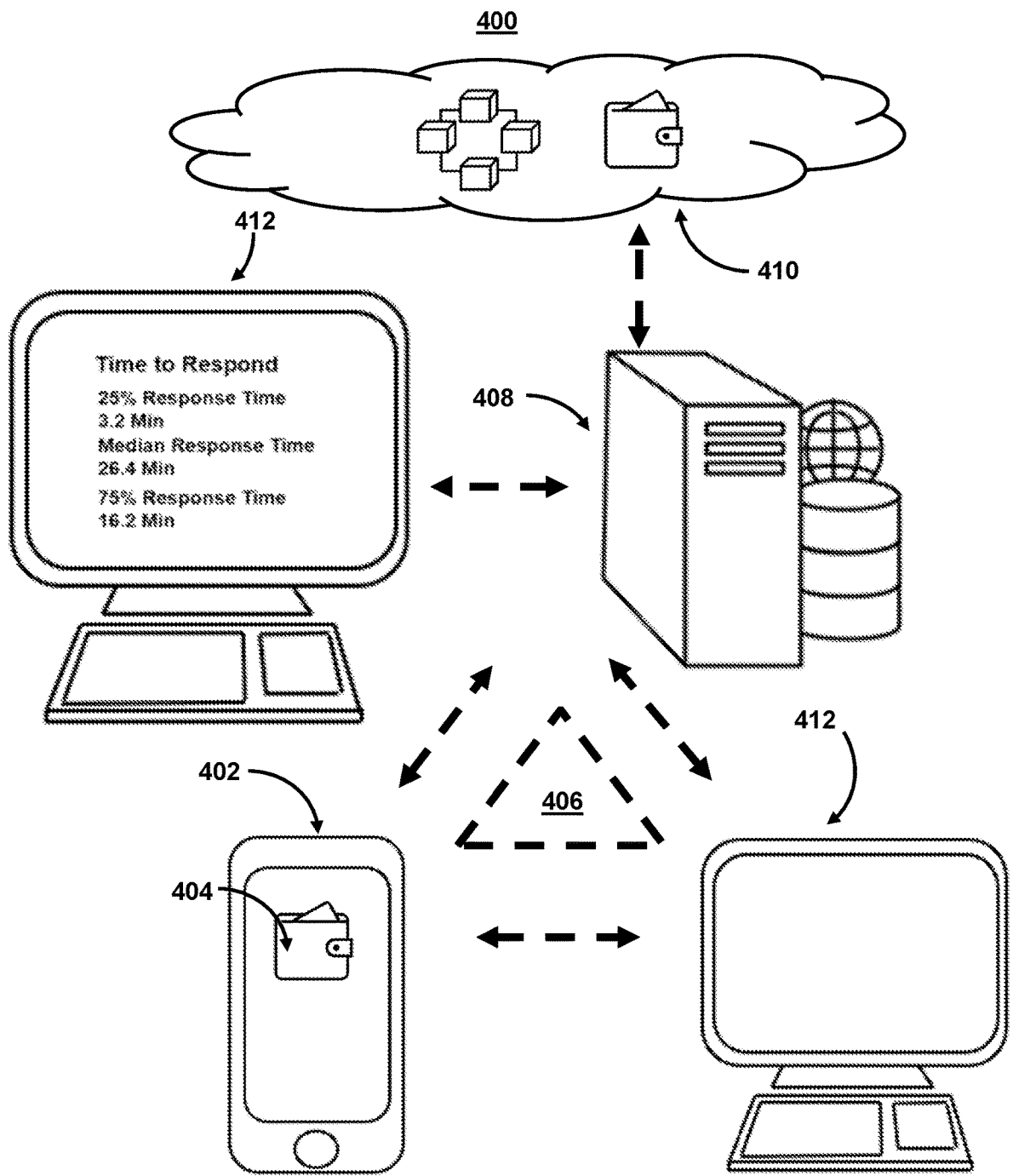
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to facilitate blockchain operations. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate blockchain operations involving on-chain and off-chain interactions across a computer network and between disparate systems. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and distributed denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords, facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflects the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which is executed on EVM. Smart contracts written in high-level languages like Solidity or Vyper may be compiled in EVM-executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart-contract operations in a manner that is discoverable and reliable.

For example, the ABI defines the methods and structures used to interact with the binary contract similar to an API, but on a lower level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

In some embodiments, server 408 may incorporate and/or have access to one or more models, which may be a machine learning model, artificial intelligence model, etc. (which may be referred to collectively as "models" herein). Model 412 may take inputs and provide outputs. The inputs may include multiple datasets, such as a training dataset and a test dataset. Each of the plurality of datasets (e.g., inputs) may include data subsets related to user data, predicted forecasts and/or errors, and/or actual forecasts and/or errors. In some embodiments, outputs may be fed back to model 412 as input to train model 412 (e.g., alone or in conjunction with user indications of the accuracy of outputs, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a processing metric and/or a value of a processing metric based on current conditions).

In a variety of embodiments, model 412 may update its configurations (e.g., weights, biases, or other parameters) based on the assessment of its prediction (e.g., outputs) and reference feedback information (e.g., user indication of accuracy, reference labels, or other information). In a variety of embodiments, where model 412 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 412 may be trained to generate better predictions.

In some embodiments, model 412 may include an artificial neural network. In such embodiments, model 412 may include an input layer and one or more hidden layers. Each neural unit of model 412 may be connected with many other neural units of model 412. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 412 may be self-learning and trained, rather than explicitly programmed, and can perform significantly better in certain areas of problem solving, as compared to traditional computer programs. During training, an output layer of model 412 may correspond to a classification of model 412, and an input known to correspond to that classification may be input into an input layer of model 412 during training. During testing, an input without a known classification may be input into the input layer, and a determined classification may be output.

In some embodiments, model 412 may include multiple layers (e.g., where a signal path traverses from front layers to back layers). In some embodiments, backpropagation techniques may be utilized by model 412 where forward stimulation is used to reset weights on the "front" neural units. In some embodiments, stimulation and inhibition for model 412 may be more free-flowing, with connections interacting in a more chaotic and complex fashion. During testing, an output layer of model 412 may indicate whether or not a given input corresponds to a classification of model 412 (e.g., a predicted hedging fee).

In some embodiments, the model (e.g., model 412) may automatically perform actions based on outputs. In some embodiments, the model (e.g., model 412) may not perform any actions. The output of the model (e.g., model 412) may be used to generate a second blockchain operation characteristic based on the processing metric and the first blockchain operation characteristic. For example, the system may determine a second blockchain operation characteristic based on the processing metric and the first blockchain operation characteristic by generating a sum of the processing metric and the first blockchain operation characteristic.

Figure 5:
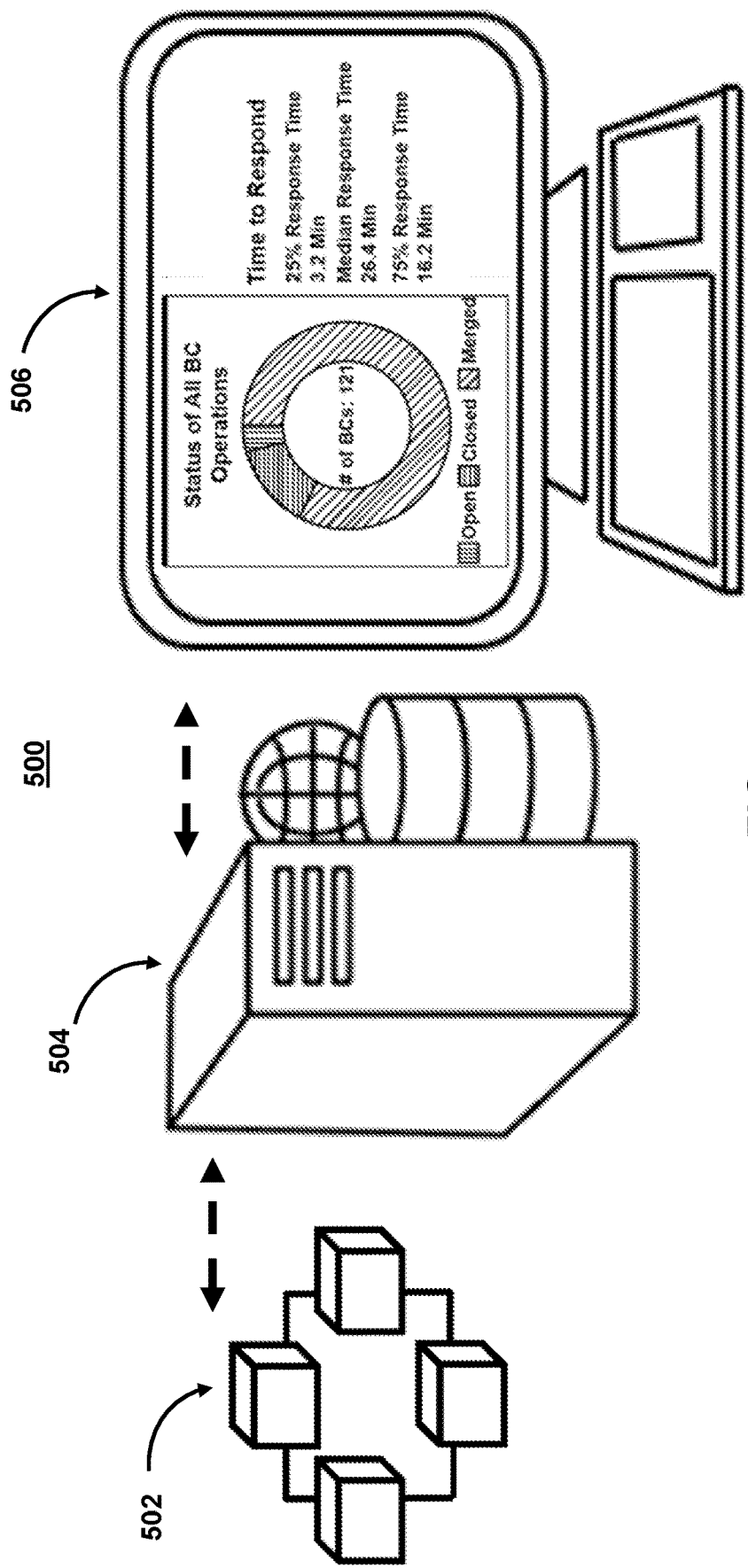
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to facilitate blockchain operations involving on-chain and off-chain interactions across a computer network and between disparate systems. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
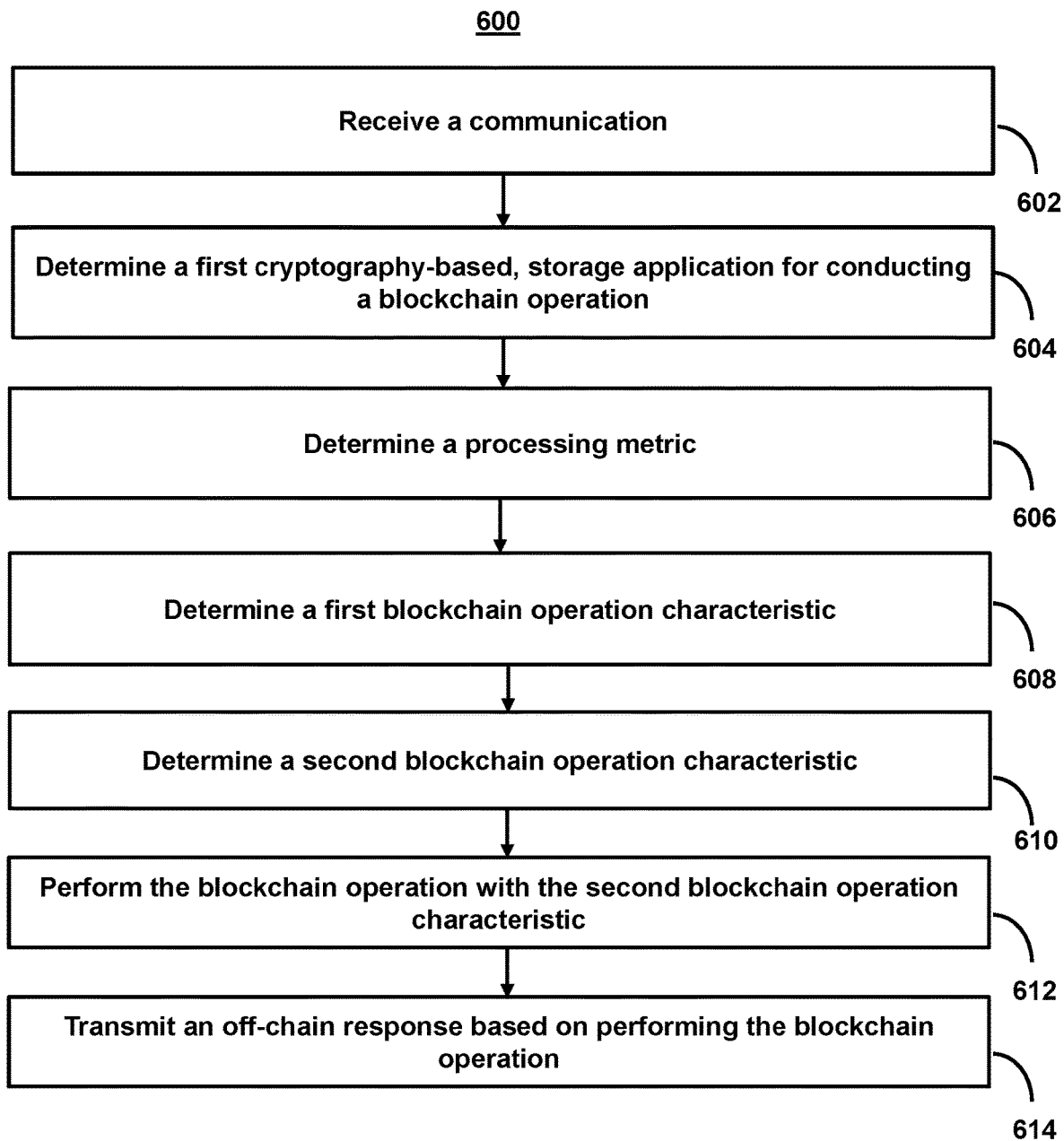
FIG. 6 shows a flowchart of the steps involved in facilitating blockchain operations, in accordance with one or more embodiments.

FIG. 6 shows a flowchart of the steps involved in facilitating a blockchain operation, in accordance with one or more embodiments. For example, the system may use process 600 (e.g., as implemented on one or more system components described above) in order to facilitate blockchain operations involving on-chain and off-chain interactions in an encrypted manner across a computer network and between disparate systems. For example, the system may be used to conduct payments between a point-of-sale terminal or other e-payment system involving a merchant and a user, in which the payments are made in a cryptocurrency and/or have some other blockchain dependency.

At step 602, process 600 (e.g., using one or more components described above) receives a communication. For example, the system may receive an encrypted communication, from an off-chain entity, to initiate an off-chain response to a blockchain operation based on an interaction between a user and the off-chain entity, wherein the off-chain response comprises an off-chain characteristic.

The system may receive an encrypted communication. For example, the system may retrieve a portion of a cryptographic key pair and verify the encrypted communication based on the portion. For example, in response to receiving a communication from an off-chain entity, the system may verify the authenticity of the communication. In some embodiments, the system may need to decrypt and/or otherwise process an encryption of the communication (e.g., an off-chain entity may use encryption to make it difficult for intruders to intercept confidential information). In some embodiments, the system may use Secure Socket Layer ("SSL") technology to encrypt the data. The system may then utilize software that validates the user's e-payment information (e.g., received at a secure server). In such cases, the system may retrieve an SSL certificate (also known as a TLS or SSL/TLS certificate), which is a digital document that binds the identity of a website to a cryptographic key pair consisting of a public key and a private key. The public key, included in the certificate, allows the merchant to initiate an encrypted communication session with the platform service via the TLS and HTTPS protocols. The private key is kept secure on a server for the merchant, and is used to digitally sign communications.

For example, the system may receive a communication from a merchant requesting authorization of a transaction involving a cryptocurrency. The merchant may be a self-managed merchant (e.g., has an account that is not managed by the platform service) or a custodial managed merchant (e.g., has an account that is managed by the platform service). In response, the system may trigger an off-chain response. The off-chain response may be a payment (e.g., in a fiat currency). For example, the interaction may comprise an electronic payment (or e-payment). An electronic payment may include any non-cash payment that does not involve a paper check (e.g., credit cards, debit cards, and/or the use of the ACH (Automated Clearing House) network). The off-chain characteristic may comprise any characteristic that may distinguish one off-chain response from another. In some embodiments, the off-chain response may comprise an e-payment. In such a case, the off-chain characteristic may comprise an amount of the e-payment.

At step 604, process 600 (e.g., using one or more components described above) determines a first cryptography-based storage application for conducting a blockchain operation. For example, the system may determine a first cryptography-based storage application for conducting the blockchain operation, wherein the first cryptography-based storage application corresponds to the user. In some embodiments, the system may receive user identifier information (e.g., a secured user account number) as well as other transaction details (e.g., an identity of the off-chain entity, an account corresponding to the off-chain entity, a time period, a good or service related to the transaction, a price related to the transaction, and/or other information related to the transaction).

In some embodiments, the system may determine the first cryptography-based storage application for conducting the blockchain operation by determining a secured user account corresponding to the user and retrieving the first address for the first cryptography-based storage application based on the secured user account. For example, in some embodiments, the system may receive user identifier information (e.g., a secured user account number) as well as other transaction details (e.g., an identity of the off-chain entity, an account corresponding to the off-chain entity, a time period, a good or service related to the transaction, a price related to the transaction, and/or other information related to the transaction). Additionally or alternatively, the first address may correspond to a non-custodial cryptography-based storage application assigned by a blockchain. The non-custodial wallet may correspond to a private and/or public key that allows blockchain operations to be performed using funds and/or information in the non-custodial wallet.

At step 606, process 600 (e.g., using one or more components described above) determines a processing metric. For example, the system may determine a processing metric, wherein the processing metric is used to account for variations in processing characteristics of a blockchain network occurring during the blockchain operation. For example, a user address may correspond to a non-custodial cryptography-based storage application assigned by a blockchain. The non-custodial wallet may correspond to a private and/or public key that allows blockchain operations to be performed using funds and/or information in the non-custodial wallet. For example, the system may determine a processing metric that corresponds to a hedging spread.

The system may use a different mechanism for determining the processing metric. For example, the processing metric may comprise determining an amount of congestion on the blockchain network corresponding to the blockchain operation and determining the processing metric based on the amount of congestion. For example, the system may monitor network conditions for a blockchain network. The system may retrieve values (e.g., indicating network congestion, current gas limits per block, etc.). The system may then compare the current network conditions to the retrieved values (or confidence thresholds based on the retrieved values). For example, the system may generate one or more thresholds (e.g., a threshold corresponding to a given likelihood that a blockchain operation will be completed with the current network conditions). In response to determining that the thresholds are not met, the system may generate a variable processing metric amount or a recommendation related to the network conditions (e.g., a warning, error, etc.).

In another example, determining the processing metric may comprise the system determining a priority corresponding to the blockchain operation and determining the processing metric based on the priority. For example, the system may monitor network conditions for a blockchain network. The system may also determine a priority corresponding to the blockchain operation. The priority may indicate how soon (e.g., in how many blocks) the blockchain operation is likely to occur. For example, the system may wish to ensure that the blockchain operation occurs within a given time period in order to ensure that a payment may be made to the merchant.

In another example, determining the processing metric may comprise the system determining a network condition. The system may then determine a feature input based on the network condition. The system may input the feature input into a machine learning model, wherein the machine learning model is trained to generate processing metrics based on historical network conditions and receive an output from the machine learning model, wherein the processing metric is based on the output. For example, the system may monitor network conditions for a blockchain network as well as historic network conditions. The system may likewise train a machine learning model based on the historic network conditions. The machine learning model may then be trained to categorize current network conditions into categories corresponding to a given variable processing metric.

In another example, determining the processing metric may comprise the system determining a current processing metric rate and determining the processing metric based on the current processing metric rate. For example, the system may select a variable processing metric based on a rate. For example, the system may apply the rate to an amount of digital assets at issue in the blockchain operation. The system may then determine the variable processing metric by applying the rate to the amount.

At step 608, process 600 (e.g., using one or more components described above) determines a first blockchain operation characteristic. For example, the system may determine a first blockchain operation characteristic based on the off-chain characteristic. For example, a blockchain operation characteristic may comprise any characteristic that may distinguish one blockchain operation from another. In some embodiments, the off-chain response may comprise an e-payment. In such a case, the blockchain operation characteristic may comprise an amount of a cryptocurrency (e.g., based on an exchange rate) corresponding to the amount of the e-payment.

At step 610, process 600 (e.g., using one or more components described above) determines a second blockchain operation characteristic. For example, the system may determine a second blockchain operation characteristic based on the processing metric and the first blockchain operation characteristic. The second blockchain operation characteristic may be the total amount of the e-payment (e.g., as exchanged into cryptocurrency) and the hedging spread.

In some embodiments, the system may determine the second blockchain operation characteristic based on the processing metric and the first blockchain operation characteristic by generating a sum of the processing metric and the first blockchain operation characteristic. The second blockchain operation characteristic may be the total amount of the e-payment (e.g., as exchanged into cryptocurrency) and the hedging spread.

At step 612, process 600 (e.g., using one or more components described above) performs the blockchain operation with the second blockchain operation characteristic. For example, the system may perform the blockchain operation with the second blockchain operation characteristic between a first address for the first cryptography-based storage application and a second address corresponding to a platform service. For example, the second address may correspond to a second cryptography-based storage application that may be a custodial or semi-custodial cryptography-based storage application that is associated with a platform service. In some embodiments, the second cryptography-based storage application may comprise an omnibus account. The omnibus account may comprise a pass-through funds account created to collect incoming payments for custodial charges.

In some embodiments, the system may perform the blockchain operation using a digital key signing ceremony. For example, the system may retrieve, from a secured user account, a first partial private key. The system may query a first user device for use of a second partial private key to perform the blockchain operation. The system may generate a first digital signature based on the first partial private key and the second partial private key and perform the blockchain operation based on a digital signature. For example, in some embodiments, the system may use a multi-computation signing system that comprises a plurality of private keys.

For example, the system may use a multi-party computation ("MPC") system. MPC involves the use of multiple parties, each of which holds respective private data that may be used to evaluate a computation without ever revealing any of the private data held by each party. For example, each party of the multiple parties may possess private data (e.g., $d_1, d_2, \ldots, d_N$). Together, the parties may use their respective private data to compute a value of a public function: (e.g., $F(d_1, d_2, \ldots, d_N)$). While the private data is used to compute a value based on the function, the private data is kept private during that process.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time.

Furthermore, the use of a private key stored at an offline location and/or on a physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline partial private key).

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to twelve signature rounds, which can create latency issues. Second, they require the use of online storage for private keys. Due to the use of partial private keys (e.g., comprising an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security).

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time.

In some embodiments, querying the first user device for the use of the second partial private key may comprise the system establishing a key-signing session between the first user device and a first remote device, wherein during the key-signing session a random nonce value is generated based on the first partial private key and the second partial private key, and wherein the random nonce value is not shared with the first user device or the first remote device. For example, the key-signing session may involve the setting of one or more parameters as well as a hash function. The system may also select a nonce value. The nonce value may be an arbitrary number that can be used once in a cryptographic communication. The system may determine the nonce value to be a random or pseudo-random number. The nonce value may be selected by the system based on an authentication protocol to ensure that previous blockchain operations (and/or communications containing them) cannot be reused. The system may also use the nonce value to initialize vectors for a hash function. For example, the system may select a nonce value to adjust the level of difficulty (e.g., the amount of work required) in a proof-of-work system.

In some embodiments, the system may select a signature scheme based on characteristics of a user device. For example, the system may determine a characteristic of the first user device and select a signature scheme for the first digital signature based on the characteristic. In some embodiments, the system may select a signature scheme based on the processing power and/or geographic location of the first user device. For example, some devices may suffer from low processing power and/or low connectivity. As such, the system may determine a characteristic of a user device and select a signature scheme based on the characteristic. For example, the system may select a Flexible Round-Optimized Schnorr Threshold (FROST) signatures protocol, which uses a two-round Distributed Key Generation (DKG) protocol to generate the nonce value required for the signature.

At step 614, process 600 (e.g., using one or more components described above) transmits an off-chain response based on performing the blockchain operation. For example, the system may transmit, from the platform service, the off-chain response to the off-chain entity. For example, following the completion of the blockchain operation, the platform service may transmit an amount (e.g., corresponding to a portion of the amount of the e-payment) to the merchant.

In some embodiments, the system may select a type of off-chain response based on characteristics about the off-chain entity. For example, the system may determine an entity characteristic for the off-chain entity (e.g., whether the off-chain entity corresponds a custodial or non-custodial account, whether the off-chain entity has certain privileges, whether the off-chain entity is registered to receive specific types of responses, etc.). The system may then determine whether the entity characteristic corresponds to a threshold characteristic. For example, the system may determine whether the entity is flagged as corresponding to a given characteristic. The system may then determine a type of off-chain response based on the entity. For example, in response to the entity characteristic corresponding to the threshold characteristic, the system may select a first type for the off-chain response (e.g., a payment in fiat currency). In response to the entity characteristic not corresponding to the threshold characteristic, the system may select a second type for the off-chain response (e.g., a payment in cryptocurrency).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving an encrypted communication, from an off-chain entity, to initiate an off-chain response to a blockchain operation based on an interaction between a user and the off-chain entity, wherein the off-chain response comprises an off-chain characteristic; determining a first cryptography-based storage application for conducting the blockchain operation, wherein the first cryptography-based storage application corresponds to the user; determining a processing metric, wherein the processing metric is used to account for variations in processing characteristics of a blockchain network occurring during the blockchain operation; determining a first blockchain operation characteristic based on the off-chain characteristic; determining a second blockchain operation characteristic based on the processing metric and the first blockchain operation characteristic; performing the blockchain operation with the second blockchain operation characteristic between a first address for the first cryptography-based storage application and a second address corresponding to a platform service; and transmitting, from the platform service, the off-chain response to the off-chain entity.

2. The method of the preceding embodiment, wherein the method is for facilitating blockchain operations involving on-chain and off-chain interactions across a computer network and between disparate systems.

3. The method of any one of the preceding embodiments, wherein determining the processing metric comprises: determining an amount of congestion on the blockchain network corresponding to the blockchain operation; and determining the processing metric based on the amount of congestion.

4. The method of any one of the preceding embodiments, wherein determining the processing metric comprises: determining a priority corresponding to the blockchain operation; and determining the processing metric based on the priority.

5. The method of any one of the preceding embodiments, wherein determining the processing metric comprises: determining a network condition; determining a feature input based on the network condition; inputting the feature input into a machine learning model, wherein the machine learning model is trained to generate processing metrics based on historical network conditions; and receiving an output from the machine learning model, wherein the processing metric is based on the output.

6. The method of any one of the preceding embodiments, wherein determining the processing metric comprises: determining a current processing metric rate; and determining the processing metric based on the current processing metric rate.

7. The method of any one of the preceding embodiments, wherein determining the first cryptography-based storage application for conducting the blockchain operation, wherein the first cryptography-based storage application corresponds to the user, further comprises: determining a secured user account corresponding to the user; and retrieving the first address for the first cryptography-based storage application based on the secured user account.

8. The method of any one of the preceding embodiments, further comprising: retrieving a portion of a cryptographic key pair; and verifying the encrypted communication based on the portion.

9. The method of any one of the preceding embodiments, further comprising: retrieving, from a secured user account, a first partial private key; querying a first user device for use of a second partial private key to perform the blockchain operation; generating a first digital signature based on the first partial private key and the second partial private key; and performing the blockchain operation based on a digital signature.

10. The method of any one of the preceding embodiments, wherein querying the first user device for the use of the second partial private key comprises establishing a key-signing session between the first user device and a first remote device, wherein during the key-signing session a random nonce value is generated based on the first partial private key and the second partial private key, and wherein the random nonce value is not shared with the first user device or the first remote device.

11. The method of any one of the preceding embodiments, further comprising: determining a characteristic of the first user device; and selecting a signature scheme for the first digital signature based on the characteristic.

12. The method of any one of the preceding embodiments, wherein determining the second blockchain operation characteristic based on the processing metric and the first blockchain operation characteristic may comprise generating a sum of the processing metric and the first blockchain operation characteristic.

13. The method of any one of the preceding embodiments, further comprising determining an entity characteristic for the off-chain entity; determining whether the entity characteristic corresponds to a threshold characteristic; in response to the entity characteristic corresponding to the threshold characteristic, selecting a first type for the off-chain response; and in response to the entity characteristic not corresponding to the threshold characteristic, selecting a second type for the off-chain response.

14. A tangible, non-transitory, machine-readable medium storing instructions that, when executed by a data processing apparatus, cause the data processing apparatus to perform operations comprising those of any of embodiments 1-13.

15. A system comprising one or more processors; and memory storing instructions that, when executed by the processors, cause the processors to effectuate operations comprising those of any of embodiments 1-13.

16. A system comprising means for performing any of embodiments 1-13.

What is claimed is:

1. A system for facilitating blockchain operations involving on-chain and off-chain interactions in an encrypted manner across a computer network and between disparate systems, the system comprising:
   one or more processors; and
   a non-transitory, computer-readable medium comprising instructions that when executed by the one or more processors cause operations comprising:

receiving an encrypted communication, from an off-chain entity, to initiate an off-chain response to a blockchain operation based on an interaction between a user and the off-chain entity, wherein the off-chain response comprises an off-chain characteristic;

determining a secured user account hosted by a platform service corresponding to the user;

retrieving a first address for a first cryptography-based storage application based on the secured user account, wherein the first cryptography-based storage application is used to conduct the blockchain operation;

determining a processing metric, wherein the processing metric is used to account for variations in processing characteristics of a blockchain network occurring during the blockchain operation;

determining a first blockchain operation characteristic based on the off-chain characteristic;

determining a second blockchain operation characteristic based on the processing metric and the first blockchain operation characteristic by generating a sum of the processing metric and the first blockchain operation characteristic;

performing the blockchain operation with the second blockchain operation characteristic between the first address for the first cryptography-based storage application and a second address corresponding to the platform service; and transmitting, from the platform service, the off-chain response to the off-chain entity.

2. A method for facilitating blockchain operations involving on-chain and off-chain interactions across a computer network and between disparate systems, the method comprising:

receiving an encrypted communication, from an off-chain entity, to initiate an off-chain response to a blockchain operation based on an interaction between a user and the off-chain entity, wherein the off-chain response comprises an off-chain characteristic;

determining a first cryptography-based storage application for conducting the blockchain operation, wherein the first cryptography-based storage application corresponds to the user;

determining a processing metric, wherein the processing metric is used to account for variations in processing characteristics of a blockchain network occurring during the blockchain operation;

determining a first blockchain operation characteristic based on the off-chain characteristic;

determining a second blockchain operation characteristic based on the processing metric and the first blockchain operation characteristic;

performing the blockchain operation with the second blockchain operation characteristic between a first address for the first cryptography-based storage application and a second address corresponding to a platform service; and transmitting, from the platform service, the off-chain response to the off-chain entity.

3. The method of claim 2, wherein determining the processing metric comprises:

determining an amount of congestion on the blockchain network corresponding to the blockchain operation; and determining the processing metric based on the amount of congestion.

4. The method of claim 2, wherein determining the processing metric comprises:

determining a priority corresponding to the blockchain operation; and determining the processing metric based on the priority.

5. The method of claim 2, wherein determining the processing metric comprises:

determining a network condition;

determining a feature input based on the network condition;

inputting the feature input into a machine learning model, wherein the machine learning model is trained to generate processing metrics based on historical network conditions; and receiving an output from the machine learning model, wherein the processing metric is based on the output.

6. The method of claim 2, wherein determining the processing metric comprises:

determining a current processing metric rate; and determining the processing metric based on the current processing metric rate.

7. The method of claim 2, wherein determining the first cryptography-based storage application for conducting the blockchain operation, wherein the first cryptography-based storage application corresponds to the user, further comprises:

determining a secured user account corresponding to the user; and retrieving the first address for the first cryptography-based storage application based on the secured user account.

8. The method of claim 2, further comprising:

retrieving a portion of a cryptographic key pair; and verifying the encrypted communication based on the portion.

9. The method of claim 2, further comprising:

retrieving, from a secured user account, a first partial private key;

querying a first user device for use of a second partial private key to perform the blockchain operation, wherein querying the first user device for the use of the second partial private key comprises establishing a key-signing session between the first user device and a first remote device, wherein during the key-signing session a random nonce value is generated based on the first partial private key and the second partial private key, and wherein the random nonce value is not shared with the first user device or the first remote device;

generating a first digital signature based on the first partial private key and the second partial private key; and performing the blockchain operation based on a digital signature.

10. The method of claim 9, further comprising:

determining a characteristic of the first user device; and selecting a signature scheme for the first digital signature based on the characteristic.

11. The method of claim 2, further comprising:

determining an entity characteristic for the off-chain entity;

determining whether the entity characteristic corresponds to a threshold characteristic;

in response to the entity characteristic corresponding to the threshold characteristic, selecting a first type for the off-chain response; and in response to the entity characteristic not corresponding to the threshold characteristic, selecting a second type for the off-chain response.

12. The method of claim 2, wherein determining the second blockchain operation characteristic based on the processing metric and the first blockchain operation characteristic may comprise generating a sum of the processing metric and the first blockchain operation characteristic.

13. A non-transitory, computer-readable medium comprising instructions that when executed by one or more processors cause operations comprising:

receiving an encrypted communication, from an off-chain entity, to initiate an off-chain response to a blockchain operation based on an interaction between a user and the off-chain entity, wherein the off-chain response comprises an off-chain characteristic;

determining a first cryptography-based storage application for conducting the blockchain operation, wherein the first cryptography-based storage application corresponds to the user;

determining a processing metric, wherein the processing metric is used to account for variations in processing characteristics of a blockchain network occurring during the blockchain operation;

determining a first blockchain operation characteristic based on the off-chain characteristic;

determining a second blockchain operation characteristic based on the processing metric and the first blockchain operation characteristic;

performing the blockchain operation with the second blockchain operation characteristic between a first address for the first cryptography-based storage application and a second address corresponding to a platform service; and transmitting, from the platform service, the off-chain response to the off-chain entity.

14. The non-transitory, computer-readable medium of claim 13, wherein determining the processing metric comprises:

determining an amount of congestion on the blockchain network corresponding to the blockchain operation; and determining the processing metric based on the amount of congestion.

15. The non-transitory, computer-readable medium of claim 13, wherein determining the processing metric comprises:

determining a priority corresponding to the blockchain operation; and determining the processing metric based on the priority.

16. The non-transitory, computer-readable medium of claim 13, wherein determining the processing metric comprises:

determining a network condition;

determining a feature input based on the network condition;

inputting the feature input into a machine learning model, wherein the machine learning model is trained to generate processing metrics based on historical network conditions;

receiving an output from the machine learning model, wherein the processing metric is based on the output.

17. The non-transitory, computer-readable medium of claim 13, wherein determining the processing metric comprises:

determining a current processing metric rate; and determining the processing metric based on the current processing metric rate.

18. The non-transitory, computer-readable medium of claim 13, wherein determining the first cryptography-based storage application for conducting the blockchain operation, wherein the first cryptography-based storage application corresponds to the user, further comprises:

determining a secured user account corresponding to the user; and retrieving the first address for the first cryptography-based storage application based on the secured user account.

19. The non-transitory, computer-readable medium of claim 13, further comprising:

retrieving a portion of a cryptographic key pair; and verifying the encrypted communication based on the portion.

20. The non-transitory, computer-readable medium of claim 13, further comprising:

retrieving, from a secured user account, a first partial private key;

querying a first user device for use of a second partial private key to perform the blockchain operation, wherein querying the first user device for the use of the second partial private key comprises establishing a key-signing session between the first user device and a first remote device, wherein during the key-signing session a random nonce value is generated based on the first partial private key and the second partial private key, and wherein the random nonce value is not shared with the first user device or the first remote device;

generating a first digital signature based on the first partial private key and the second partial private key; and performing the blockchain operation based on a digital signature.

* * * * *